United States Patent [19]

Blanquet

[11] Patent Number: 4,476,070
[45] Date of Patent: Oct. 9, 1984

[54] COOLING WATER DISTRIBUTION SYSTEM OF COOLING TOWER

[75] Inventor: Jean-Claude Blanquet, Houilles, France

[73] Assignee: CEM Compagnie Electro-Mecanique, Paris, France

[21] Appl. No.: 448,234

[22] Filed: Dec. 9, 1982

[30] Foreign Application Priority Data

Dec. 9, 1981 [FR] France .............................. 81 22988

[51] Int. Cl.$^3$ .............................................. B01F 3/04
[52] U.S. Cl. ..................................... 261/151; 261/111
[58] Field of Search ................................. 261/111, 151

[56] References Cited

U.S. PATENT DOCUMENTS

| | | | |
|---|---|---|---|
| 2,979,156 | 4/1961 | Sebald | 261/111 |
| 4,003,970 | 1/1977 | Vodicka | 261/111 |
| 4,032,604 | 6/1977 | Parkinson et al. | 261/111 |
| 4,229,388 | 10/1980 | Lignell | 261/111 |

*Primary Examiner*—Tim Miles
*Attorney, Agent, or Firm*—Burns, Doane, Swecker & Mathis

[57] ABSTRACT

A cooling water distribution system for an air cooler includes a condenser that is subdivided into two independent bodies forming separate compartments, one or the other of which may be temporarily shut down. The water distribution system itself may be, similarly to the condenser, subdivided into two independent hydraulic circuits, each having its own pump and serving its own sprinklers, so that in the case of the shutdown of one of the two hydraulic circuits, the sprinklers in the other circuit remain in service, as they continue to be normally supplied without being affected with repect to their supply by the shutdown of the first circuit. The invention is particularly applicable to central air conditioning installations.

3 Claims, 4 Drawing Figures

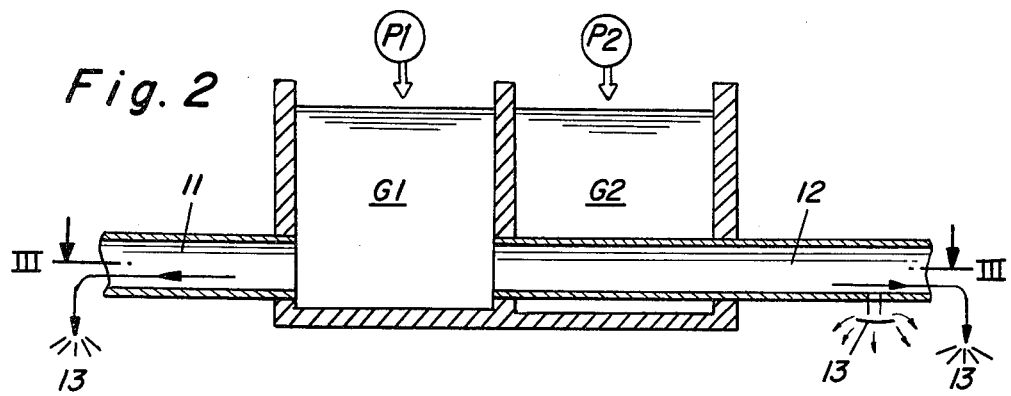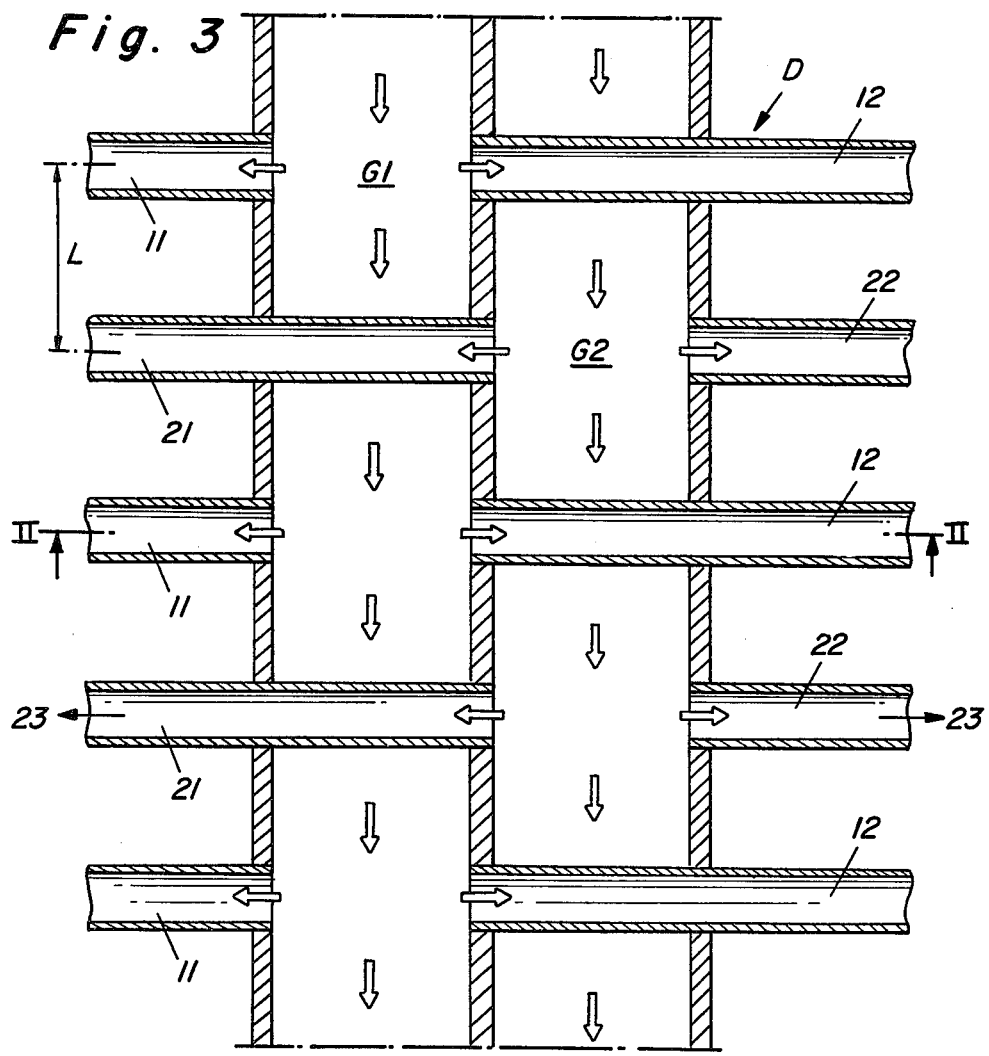

COOLING WATER DISTRIBUTION SYSTEM OF COOLING TOWER

BACKGROUND OF THE INVENTION

The present invention relates to cooling systems of the type which use the flow of water from sprinklers in free air and, more particularly, to a cooling water distribution system which operates in conjunction with a condenser divided into two separate cooling water compartments and which permits continued, normal operation at a reduced flow rate while one condenser compartment is inoperative.

Central air conditioning systems having towers for the cooling of water coming from condensers at the present time commonly employ atmospheric cooling towers of the humid type making use of a flow of water in free air: part of this water may evaporate while cooling the rest, which remains in the liquid state and is collected at the bottom of the tower to be recycled, after having been duly compensated for the evaporation losses by a corresponding addition of fresh water.

In order to assist in an understanding of the background for the present invention, reference is made to FIG. 1 of the drawing attached hereto which shows in a highly schematic manner a conventional cooling tower T formed, as usual, by a concrete circumference, the very large diameter circular base B of which rests, at a few meters above the ground, on the periphery of a scaffolding or support frame S, providing free access to an ascending flow of air F moved by natural or forced draft in the vast chimney constituted by the tower T.

At the bottom of the tower, across its base B, extends the air cooling portion, the essential component of which is a water distributor D in the form of a horizontal, thin sheet forming a channel G having a plurality of branches departing from the channel and ending in a plurality of sprinkling nozzles (not shown), designed and arranged to cover a sprinkling zone occupying practically the entire base section of the tower through which the ascending flow of air F is flowing. The flow of water supplied to the channel G, which has a supply collector for the sprinkler nozzles, may amount to tens of thousands of cubic meters per hour. This water comes from the condenser C by means of a pump P discharging into an intake conduit A. The water that is not evaporated drips down and is recovered at R and returned, through a recycle conduit Z, to the condenser C.

As a general rule, the condenser is subdivided into two sections or independent bodies forming separate compartments, for reasons of safety and also to permit the central installation to continue to operate with one compartment—even though at a reduced rate—in case of a breakdown or intentional shutdown (for example, for maintenance of one compartment).

However, in such a case, the flow rate of the distributor D is severely reduced, roughly to one half of the nominal flow, which has detrimental consequences in regard to the output of the sprinklers. Each sprinkler is designed to operate within relatively narrow confines and its nominal individual supply rate and this design determines not only the configuration and dimensions of the area sprinkled by each nozzle, but also its ability to break up the compact liquid flow fed to it, into a fog of droplets: a severe reduction in the feed rate would result in a strong reduction in the range of the nozzle and thus in the elementary zone sprinkled by it, and even in a transformation of the sprinkling mode from a desirable "rain" into a detrimental "jet" straight from the nozzle, somewhat like a shower with a slightly open faucet.

This condition results in very poor cooling of the condenser water and certainly the air conditioning unit no longer performs as designed, with all the consequences that may be involved.

OBJECT AND BREIF SUMMARY OF THE INVENTION

The primary object of the present invention is to eliminate the aforementioned disadvantages afflicting conventional air coolers jointed to a double body condenser.

According to the present invention, the cooling water distribution system of the air cooler is, in a manner similar to the condenser, itself subdivided into two independent hydraulic circuits, each having its own pump and serving its own sprinklers, so that in the case of a shutdown of one of the condenser bodies and consequently of one of said hydraulic circuits, the sprinklers belonging to the other circuit, which remains in service, will be supplied normally without ill effects due to the shutdown of the first circuit.

According to a preferred embodiment of the present invention, the sprinklers following the distributor in line are connected alternatingly to one or the other of the two hydraulic circuits to form together an overlapping pattern of sprinklers supplied by each of the hydraulic circuits. It is advantageous to determine the number, the nature and the spacing of the sprinklers so that the range of each sprinkler is superposed on that of an adjacent sprinkler supplied by a different supply circuit so that, in the case of the shutdown of one of the two hydraulic supply circuits, the sprinklers remaining in operation cover by themselves nearly all of the available surface of the cooling tower.

The description hereinafter, presented in conjunction with the drawings attached hereto, will render the invention more apparent to one skilled in the art with the aid of a non-limiting example.

BRIEF DESCRIPTION OF THE DRAWINGS

FIG. 2 is a partial view in a vertical cross section on the line II—II of FIG. 3, displaying the two separate hydraulic systems to supply the sprinklers.

FIG. 3 is a similar view in a horizontal cross section on the line III—III of FIG. 2.

DETAILED DESCRIPTION

Figure 1:
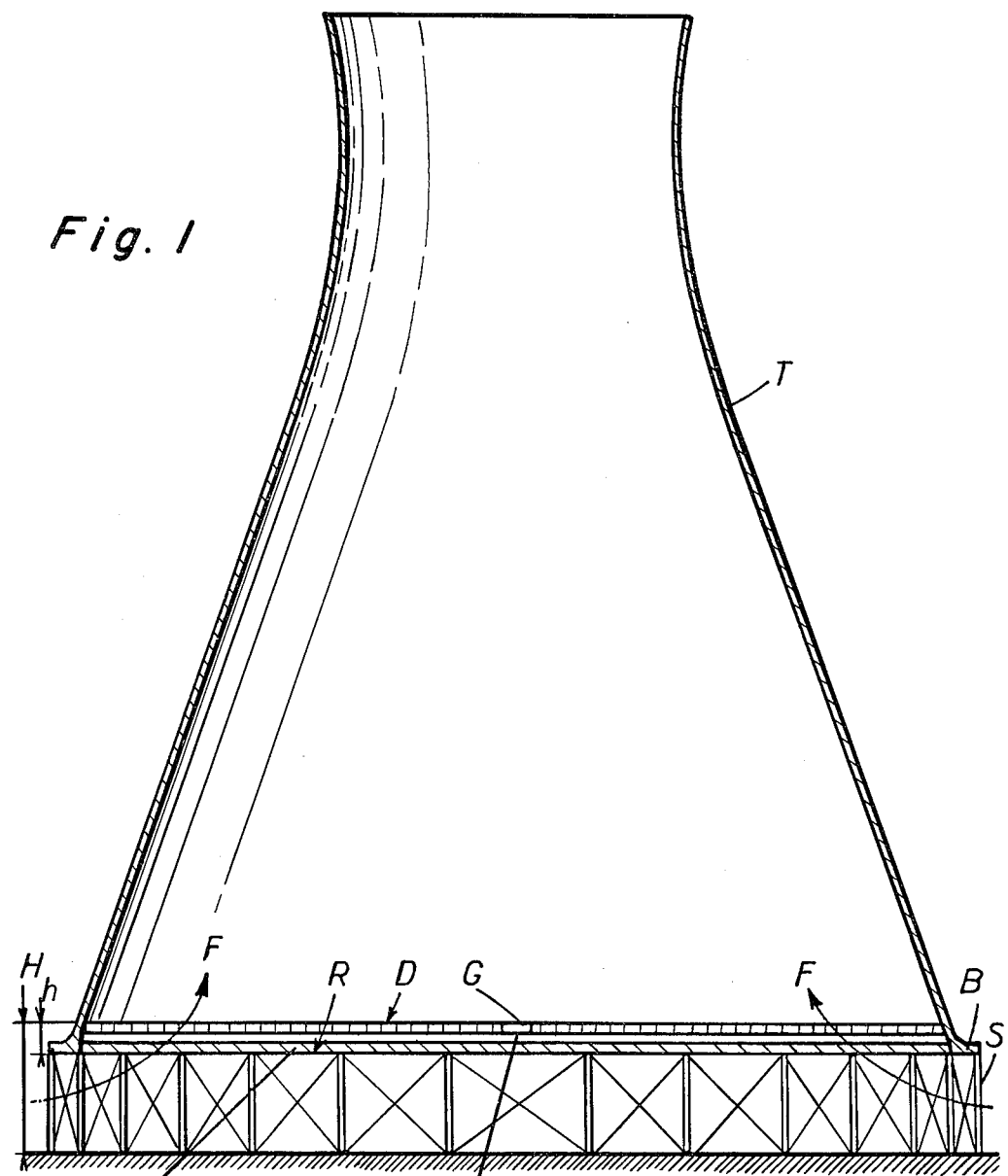
FIG. 1 to which reference has been made in the introducton hereinabove, is a schematic view in a vertical cross section of a cooling tower, showing the connections of the air cooler to the condenser of the aircondiitioning installation.
Figure 1A:
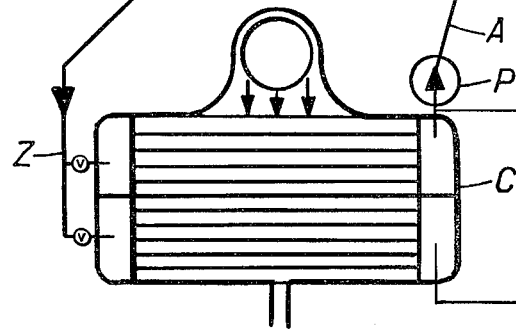
FIG. 1A is a schematic view of the condenser as modified to incorporate two pumps in accordance with the present invention.
Figure 1A:
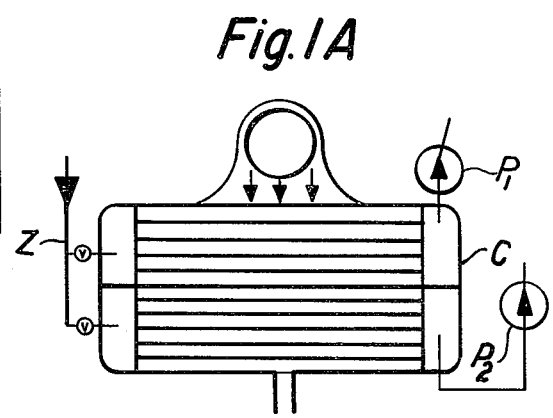

With reference to FIGS. 2 and 3, the single central feed channel G of the distributor D of FIG. 1 is replaced, according to the present invention, by two contiguous distribution conduits G1 and G2 supplied, respectively, from each of two condenser bodies by two independent pumps, schematically indicated at P1 and P2. These two pumps replace the single pump P shown in FIG. 1 and are respectively connected to the two output lines from the two compartments of the condenser, as shown in FIG. 1A. The conduit G1 forms the supply collector for a series of successive branches 11 extending opposite the conduit G2 and for a further series of successive branches 12, passing through the latter to extend beyond it. Similarly, the conduit G2 forms the feed collector for a series of successive branches 21 located between the branches 11 and for a further series of successive branches 22 located between the branches 12 (FIG. 3). It is thus seen that the distributor D comprises a network of interlaced conduits 11 and 21 on the one hand, and 12 and 22 on the other, belonging alternatingly to the hydraulic circuit G1 and the hydraulic circuit G2. All of the branches serve sprinklers, with those being supplied by the conduit G1 shown at 13 and those supplied by the conduit G2 indicated at 23.

After passing through the distributor, along the branches, one finds alternatingly a sprinkler 13 and a sprinkler 23, the sprinklers 13 and 23 being placed with respect to each other to avoid having two sprinklers 13 or 23 of the same type being located adjacent to each other.

During normal operation, the two pumps P1, P2 rotate and each supply a distributor conduit, with the system being organized so as to insure regular dispersion by the installation.

However, in certain cases, only one pump is operating and it is imperative to distribute the water in an equal manner over the entire surface of the cooler. The following three cases may occur:

1. pumps P1 and P2 are operating;
2. pump P1 is operating, pump P2 is at standstill; or
3. pump P2 is operating, pump P1 is at standstill.

Water is transported through the two contiguous conduits G1 and G2, to which the conduits carrying the sprinkler devices 13, 23 are attached.

The distribution of the water is then assured automatically in the following manner, depending on the above-mentioned cases:

1. all of the tubing 11-12, 21-22 is supplied, as are all of the sprinklers 13, 23;
2. one of the tubing systems is supplied (11 but not 21 on the one hand, and 12 but not 22, on the other);
3. one of the tubing systems is supplied; the inverse of 2 above (21 but not 11 on the one hand, and 22 but not 12, on the other).

It is sufficient to equip the tubing with sprinklers 12, 23 having a sprinkling range equal to or greater than the distance L between pipes, to insure uniform distribution over the either surface even though at a density half that obtained with both pumps P1, P2.

This solution provided in accordance with the present invention eliminates all valves, sills or any other mechanical or hydraulic device.

The water delivered by the distributor D described hereinabove, may be collected advantageously by a recuperator R which can be implemented, for example, according to the disclosure of German Pat. No. 308,290 of Jan. 22, 1915.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Moreover, variations and changes may be made by those skilled in the art without departing from the spirit of the present invention.

What is claimed is:

1. Cooling water distribution system associated with a condenser divided into two independent bodies forming separate compartments, one or the other whereof may be temporarily shutdown, said water distribution system itself being, similarly to the condenser, divided into two independent hydraulic circuits, each having its own pump and serving its own sprinklers, said water distribution system comprising an integral assembly in the general form of a horizontal sheet of a low thickness forming two channels and a single support, wherein the said independent hydraulic circuits together with their respective groups of sprinklers form a overlapping pattern of water spray so that in the case of the shutdown of one of the two bodies of the condenser and consequently of one of said hydraulic circuits, the sprinklers belonging to the other circuit which remains in service, are supplied normally without being affected in their operation by the shutdown of the first circuit.

2. Cooling water distribution system according to claim 1, wherein the sprinklers following the distributor in line are connected alternatingly with one or the other of the two hydraulic circuits, so as to constitute together an overlapping pattern of sprinklers alternatingly supplied by one and the other of the hydraulic circuits.

3. Cooling water distribution system according to claim 2, wherein the area covered by each sprinkler overlaps with that of the adjacent sprinklers, so that in the case of the shut-down of one of the two hydraulic supply systems, the sprinklers of the group that continues to be supplied covers effectively by itself nearly all of the available surface area of the air cooler, in spite of the shutdown of the sprinklers of the other group.

* * * * *